United States Patent [19]

Vetter

[11] Patent Number: 5,739,895
[45] Date of Patent: *Apr. 14, 1998

[54] FILM SAVING SYSTEM

[75] Inventor: Richard Vetter, Pacific Palisades, Calif.

[73] Assignee: United Artists Theatre Circuit, Inc., Englewood, Colo.

[*] Notice: The term of this patent shall not extend beyond the expiration date of Pat. No. 5,534,954.

[21] Appl. No.: 584,165

[22] Filed: Jan. 11, 1996

Related U.S. Application Data

[63] Continuation-in-part of Ser. No. 221,036, Mar. 31, 1994, Pat. No. 5,534,954, which is a continuation-in-part of Ser. No. 807,056, Dec. 12, 1991, abandoned.

[51] Int. Cl.$^6$ ........................................ G03C 1/76
[52] U.S. Cl. .......................... 352/79; 352/168; 352/241
[58] Field of Search ........................... 352/79, 168, 241

[56] References Cited

U.S. PATENT DOCUMENTS

| | | | |
|---|---|---|---|
| 1,032,172 | 7/1912 | Zollinger | 352/79 |
| 3,583,803 | 6/1971 | Cole | 352/241 |
| 3,751,144 | 8/1973 | Greger | 352/239 |
| 3,865,738 | 2/1975 | Lente | 352/79 |
| 4,900,293 | 2/1990 | McLendon | 352/241 |
| 5,312,304 | 5/1994 | Vetter | 352/241 |
| 5,534,954 | 7/1996 | Vetter | 352/79 |

*Primary Examiner*—Safet Metjahic
*Assistant Examiner*—Michael Dalakis
*Attorney, Agent, or Firm*—Freilich Hornbaker Rosen

[57] ABSTRACT

A new 35 mm motion picture film is described which minimizes the amount of film stock that is used, and which facilitates industry acceptance by assuring at least present image quality. The new motion picture format (12) has film frames (20) of a size (22, 24) that is slightly greater than that (J, K) of the mask aperture (H) of the current Wide Screen Academy Format. However, the film frames are spaced by a distance (26) that is more than two but less than three times a standard perforation spacing distance (E). The film stock can be different from current film stock, with a perforation spacing distance (48, 68) that results in 2 or 3 perforations per frame.

11 Claims, 2 Drawing Sheets

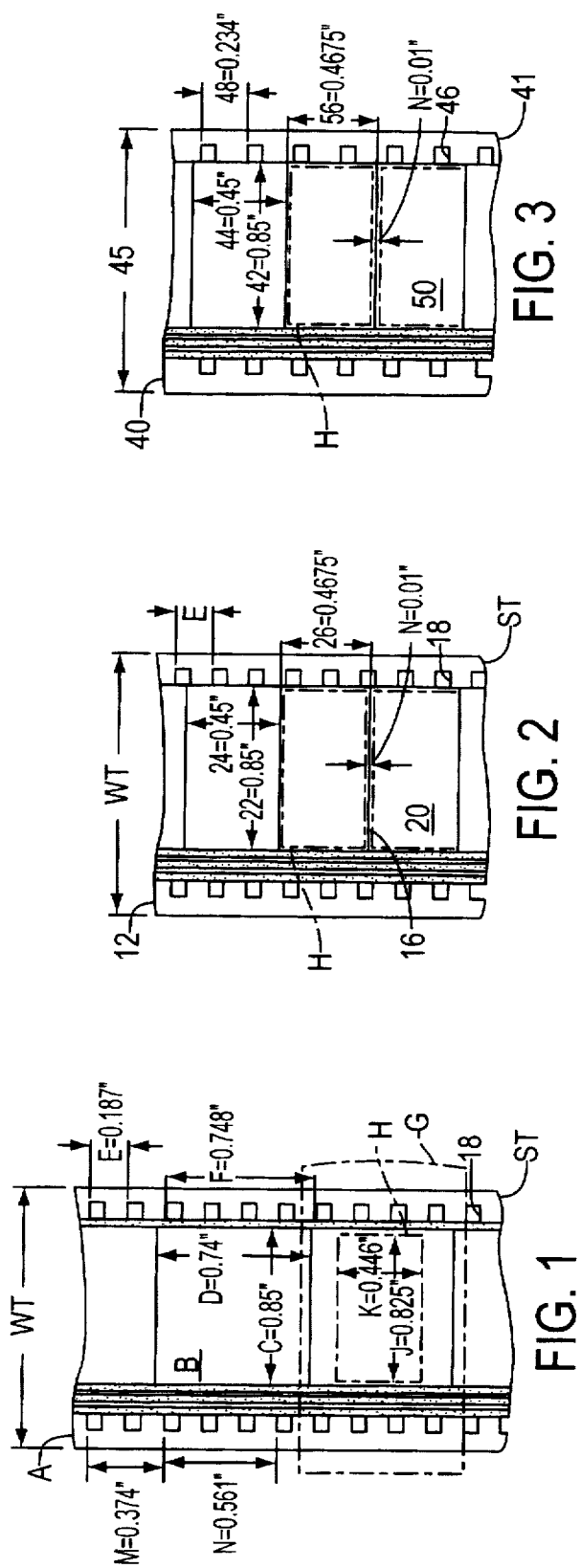

FILM SAVING SYSTEM

CROSS-REFERENCE

This is a continuation-in-part of U.S. patent application Ser. No. 08/221,036 filed Mar. 31, 1994, now U.S. Pat. No. 5,534,954, which is a continuation-in-part of U.S. patent application Ser. No. 07/807,056 filed Dec. 12, 1991, now abandoned.

BACKGROUND OF THE INVENTION

In the 1880's, an Academy Standard film format was created, wherein the film stock had two rows of sprocket holes, or film perforations spaced by substantially 0.187 inch, each film frame had an aspect ratio (width divided by height) of 1.37:1, and the film frames were spaced by four perforations (0.748 inch). This format was widely adopted in the 1920's. In the 1950's, a new projection aspect ratio called Wide Screen Academy Format was adopted, wherein the same film stock and format was used, but the aperture of the projector film gate was changed so the projected image had a smaller length, or height, than previously, for an aspect ratio of 1.85:1. It was thought that the wider format would differentiate the motion picture images from television images. However, the film frames were still of the same size and still spaced by four perforations, with the top and bottom of each frame cropped to produce an aspect ratio of 1.85. As a result, the gap or space between the projected areas of adjacent film frames occupied about 40% of the length of the film stock. The film titles were centered on the film frames, to aid the projectionist to adjust the framing knob so the center of the film frames lay at the center of the projection aperture of the film gate mask.

It would appear that the reason why the Wide Screen Academy Format was readily accepted by theater owners was that about the only change to the projector was to install a new film gate mask and to replace the lens. This current format has been in use up to the present, for more than 90% of all release prints. A small number of release prints are in the Cinemascope format, wherein the same film stock is used, but the film frames have a greater height.

There have been suggestions for minimizing the amount of film used. For example, Butler U.S. Pat. No. 3,565,521 and Cole U.S. Pat. No. 3,583,803 suggest the use of projection apertures (at the film gate mask) of smaller heights and different aspect ratios to save the amount of film used when standard 35 mm film stock is used. However, because of competition from television and aversion to any change that would degrade the motion picture image, there is reluctance to accept a smaller projection aperture size.

Lente U.S. Pat. No. 3,865,738 suggests the use of the current projection aperture, with film frames of smaller height and spaced by only three sprocket holes to minimize wastage. Although this would result in reducing film "wastage" from about 40% to 20%, this format has not been adopted. A new film format that used substantially the current projection aperture size while virtually eliminating film "wastage," would be more readily accepted by the motion picture film industry.

SUMMARY OF THE INVENTION

In accordance with one embodiment of the present invention, a method and apparatus provide a motion picture film format that greatly reduces the amount of required film stock, while encouraging theater owners to accept the new format. The new film format uses substantially 35 millimeter wide film with film frames that are substantially as wide as those of the current Academy Format. However, the film frames are spaced by much less than the frame spacing of the current Academy Format (which is 0.748"), with the new spacing being more than 0.38 inch but less than 0.55 inch.

In a preferred embodiment of the invention, the film frames are spaced by about 0.47 inch, which is about 63% of the spacing of the current Academy Format. This results in virtually all of the film stock length being occupied by film frames of substantially the present projection aperture size.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front elevation view of the prior art, but currently used, Academy Format, which uses standard 35 mm film stock with film frames spaced by 4 standard perforations.

FIG. 2 is a front elevation view of a new motion picture film of a first embodiment of the present invention, which uses standard 35 mm film stock but with film frames spaced by 2.5 perforations.

FIG. 3 is a front elevation view of a new motion picture film format of a second embodiment of the invention, which uses a modified 35 mm film stock that has a larger perforation spacing than the standard film stock of FIGS. 1 and 2.

FIGS. 4 and 4A are front elevation views of a new motion picture film format of a third embodiment of the invention, which uses a differently modified 35 mm film stock that has a smaller perforation spacing than the standard film stock of FIGS. 1 and 2.

DESCRIPTION OF THE PREFERRED EMBODIMENTS

Figure 5:
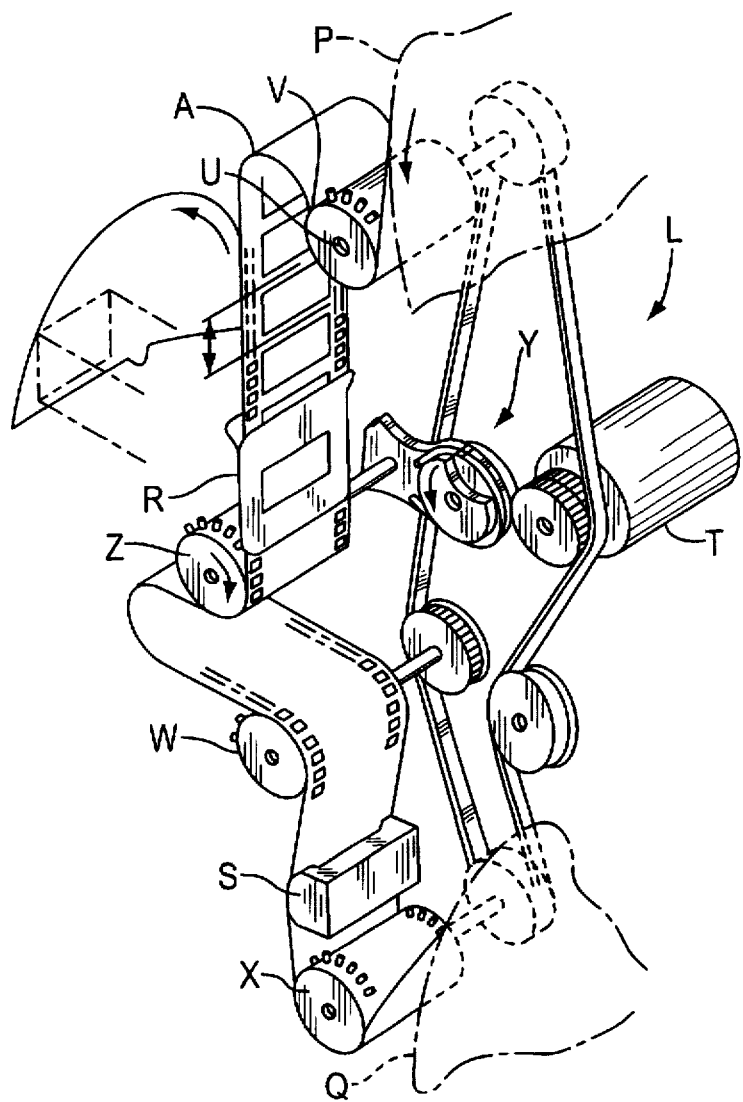
FIG. 5 is a simplified partial isometric view of a commercial motion theater projector of the prior art.

FIG. 1 illustrates the film format A called Academy Standard, which has been generally used for commercial theater distribution prints between the 1920's and the present, and which is currently in use for over 90% of theater distribution prints. Each film frame B has a width C of about 0.85 inch and a length or height D of about 0.74 inch. The film stock ST is "standard" 35 mm film stock, which has an overall width WT of about 35 millimeters. The film stock has two rows of sprocket holes or perforations 18, with a "standard" center-to-center perforation distance E of substantially 0.187 inch (shrinking or expansion can change this slightly, usually by less than 1%). The film frames B are spaced by a distance F of four perforations, or 0.748 inch. Each film frame B has an aspect ratio (width C to height D) of 1.37:1. Until the 1950's, almost the entire height D and width C were projected onto theater screens, by the use of a projection aperture of only slightly smaller height and width than the film frames.

In the 1950's, competition from television resulted in the motion picture industry adopting a new aspect ratio which is called the Wide Screen Academy Format. This was accomplished by using a new film gate mask G with a projection aperture H of the same width J of 0.825 inch as previously, but which had a smaller height K of 0.446 inch. The top 20% and bottom 20% of each film frame are cropped (not projected). The projection aperture and projected image each has an aspect ratio of 1.85:1. It was thought that this aspect ratio would further distinguish motion picture films from television (video). It is noted that motion picture cameras continue to use the format A of FIG. 1, which is the current television format.

In the current Academy Format of FIG. 1, the frames are spaced by the distance F of four perforations. It is believed that the format A with a different mask projection aperture H was readily accepted by theater owners because it required minimal change to the then-current film projectors. That is, about the only change was to replace the film gate mask, and to replace the lens with one of shorter focal length (to account for the wider screen).

The current format A obviously wastes a lot of film, because the projection aperture (of 0.446 inch height) occupies only 60% of the pull down distance (0.748 inch), so about 40% is "wasted". This waste has been long recognized and there have been many suggestions for avoiding such wastage. However, no format or system has been acceptable. Many suggestions are to use smaller film frame sizes, to take advantage of increases in resolution obtainable with the most modern film stock. However, there is fear in the industry that any reduction in frame size would decrease resolution and screen brightness, and hurt the competitive lead over television. One suggestion (in U.S. Pat. No. 3,865,738 by Lente issued Feb. 11, 1975) is to use standard 35 mm film stock, but to space the frames by three sprocket holes, or perforations, instead of four, which would mean that only about 20% of the film would be wasted and 80% would be used. This suggestion has not been accepted by the motion picture film industry. A format that used an even greater percentage of the film stock, while still providing substantially the present film frame area (H) for projection onto a screen, would have an increased chance of acceptance.

In order for a new format to be acceptable, it should permit low cost conversion of present projectors between the current and new format, and back again, to project both formats. FIG. 5 is a simplified illustration of a commercial motion picture film projector L of a type that is currently in use. The projector passes film A from a supply reel P to a takeup reel Q (the two reels are commonly stacked on one another as platters of a platter system). The film moves through a film gate R (of which the part G is shown in FIG. 1) and past a sound head S. A constant speed motor T is connected through shafts U to several sprocket wheels V, W, X that move the film at a constant speed of substantially ninety feet per minute from the supply reel to the takeup reel. The sprocket wheels turn at a speed of 6 rps. A 4-star Geneva movement Y drives an additional sprocket wheel Z that moves the film intermittently by a distance of 0.748 inch every twenty-fourth of a second, to pull it intermittently through the film gate R.

There is a common sprocket wheel size that is used for almost all sprockets wheels including those V, W, X that turn at a constant speed, and including the pull-down sprocket wheel Z that is turned intermittently. Each of these sprocket wheels has sixteen teeth for each 360° (i.e. it has two sets of sixteen teeth each), and each sprocket wheel is turned by 90° every one twenty-fourth of a second. In a first embodiment of the invention, applicant uses standard 35 mm film stock, but modifies the film format to place the film frames closer together. Also, applicant replaces the sprocket wheels V, W, X and Z with new sprocket wheels having fewer sprocket teeth (e.g. 10 teeth per 360° instead of the current 16 teeth).

FIG. 2 shows a new film format 12 that replaces the current format A of FIG. 1. In the new format of FIG. 2, the film stock ST is identical to that of the current standard 35 mm film stock, with perforations 18 spaced apart by distance E of 0.187 inch. Each film frame 20 has about the same width 22 (0.85 inch) as the current format A. However, each film frame has a much shorter height 24 of about 0.45 inch. In FIG. 2, the height 24 is between 0.446 and 0.4675 inch. The film is designed for use with a film gate projection aperture H of the same width J and height K as is currently used.

For the new format of FIG. 2, the leading edges 16 of the frames 20 are spaced by a distance 26 equal to the spacing of 2.5 perforations of the current standard 35 mm film stock, or 0.4675 inch. The spacing of a pair of film frames is the distance or spacing of their leading edges (or of their centers, or of their trailing edges). The present spacing 26 of the film frames by 2.5 perforations, which is a noninteger number of perforations, results in substantially all of the film being used and substantially none being wasted.

In order to keep the present projection frame area H that has a height of 0.446 (which equals 2.38 times 0.187 inch), the frames must be spaced by at least 2.38 current perforations. However, it is difficult to convert a projector to such a number, and the number 2.5 is chosen.

In order to use a current projector with 16 tooth sprocket wheels to project applicant's new format 12, the current sprocket wheels are replaced with 10 tooth sprocket wheels to advance the film by 2.5 perforations instead of 4 perforations, every twenty-fourth of a second. Also, a new film shoe insert and a modification to the sound system is made. The relatively modest conversion cost to the theater owner makes the new format more acceptable to him. Such acceptance is aided by the fact that each film frame 20 has a projection area at H, of the same width and length as is used for the current format A, so the motion picture theater industry need not be concerned with a possible degradation of quality.

In the format 12 of FIG. 2, the distance N between the projected portions at H of adjacent frames is a distance N of about 0.01 inch, i.e. about 0.005 inch at the top and 0.005 inch at the bottom of each frame. This distance N is 2% of the 2.5 perforation pull down distance 26 of 0.4675 inch, or 1% at the top and 1% at the bottom. This distance N is required to account for the fact that the height K of film mask projection apertures vary slightly, and that a slight margin around the projection aperture is required to assure that portions of adjacent frames will not be projected. Accordingly, it may be said that the present format provides the required margin and that substantially none of the film length is "wasted." It should be realized that each film frame can be made to occupy the entire 0.4675 inch pull-down distance, so there is no line between adjacent frames.

Although applicant changes the format of the distribution print such as shown at 12 in applicant's FIG. 4, the film format used by the cameraman is likely to be the same as shown at A in FIG. 1, so original cameras and post production equipment does not have to be changed, and so that frames B of an aspect ratio of 1.37:1 are available for showing on television in the present television format. In both the current format A and the new format 12, the frames of the release print used in the theater projector are of unity magnification of the original frames exposed by the camera; that is, all objects in each frame are of the same size in the release print as on the camera negative. Although the middle portions of the camera negative frames are substantially identical to those of the new release print (except one is a negative and one is a positive), the camera film frames are spaced by the traditional integer number (4) times the sprocket hole spacing, rather than by a new noninteger number (2.5).

If applicant's new format and replacement sprocket wheels are accepted, there will be a transition period during which films of the new format shown at 12 in FIG. 4, are available to theater owners at the same time as films of the current format shown at A in FIG. 1. A projectionist can convert a projector between the current format A of FIG. 1 and the new format 12 of FIG. 4, by replacing one set of current sprocket wheels (e.g. with 16 teeth per 360°), with a set of new sprocket wheels (e.g. 10 teeth per 360°). The projectionist can convert back by replacing the new sprocket wheels with the current ones. Thus, applicant's new film format and new sprocket wheels, not only increase acceptance because of the relatively low cost for switching and because of assurance of film projection areas as large as current ones, but also assures the theater owner that he will be readily able to project both the current and new formats. The motion picture images can be initially "taken" or exposed with a camera that produces the present camera format A, wherein the film frames are spaced by four perforations. These images then can be transferred to release prints using the new format of 2.5 perforation spacing.

FIG. 3 illustrates part of a distribution print or film 40 of another new format which is largely similar to the film 12 of FIG. 2, except that the film 40 uses a modified 35 mm film stock 41. The modified film stock 41 has a width 45 which is about the same (35 millimeters) as current standard film stock (of width WT). However, the modified film stock has perforations 46 that are spaced by a distance 48 that is chosen so there are exactly 2 perforations per film frame 50. The width 42 and height 44 of each film frame are shown as being the same as that of FIG. 2.

As mentioned above, the perforation spacing 48 in FIG. 3 is made to be precisely half the film frame spacing, so the perforation spacing 48 is 0.234 inch, instead of the current spacing E of 0.187 inch. The width 22 and height 24 of each frame can be the same as that for the format of FIG. 2. A perforation spacing of more than 0.2 inch distinguishes the film stock 41 from current standard film stock ST (which has a perforation spacing of 0.187").

A major advantage of the format of FIG. 3 (two long perforations per frame) as compared to the format of FIG. 2 (2.5 current perforations per frame), is that the format of FIG. 3 is easier to understand. That is, some people are uneasy in trying to think about moving film by a noninteger number of perforations in each step, and in turning a sprocket wheel by a noninteger number of teeth in each step. Applicant has first determined the film frame spacing 26 in FIG. 2, using the current film stock ST, and then used this film frame spacing (26 which approximately equals 56) to determine the perforation spacing (48 which equals exactly one-half of 56).

As long as applicant is selecting a new film stock, applicant can slightly vary the perforation spacing. For example, instead of using a frame spacing 56 of 0.4675 inch (and a perforation spacing 48 of 0.235"), applicant can use a frame spacing of 0.5 inch (equivalent to almost 2.75 perforations of the standard film stock ST), which results in a perforation spacing of 0.25 inch. However, if the same frame area H is projected, then this will result in about 7% of film wasted as compared to using a frame spacing of 0.4675 inch. In all cases, the spacing between film frames will be more than the spacing of two standard, or current perforations (i.e. over 0.38 inch=2×0.187") and less than the spacing of three standard perforations (i.e. less than 0.56 inch=3×0.187"). The film frame spacing is preferably no more than that of 2.75 current perforation spacings (i.e. no more than 0.514 inch), so that no more than about 10% of film is wasted (compared to a spacing of 2.5 current perforation spacings).

FIG. 4 illustrates part of a distribution print or film 60 of another new format which is largely similar to the film 12 of FIG. 2, except that it uses a further modified 35mm film stock 62. The film stock 62 has perforations 66 that are spaced apart by a distance 68 that is chosen so there are exactly 3 perforations per film frame 70. Each frame is shown as having the same width 42 and height 44 as in FIG. 3 (and FIG. 2). Where a frame spacing 56 is chosen that is equal to that of FIGS. 2 and 3 (0.4675"), the perforation spacing 68 is 0.156 inch (one-third of 56) or about 0.16 inch. Of course, the actual frame spacing can be varied slightly, as described above for the case of the film of FIG. 3. A perforation spacing of less than 0.180 inch distinguishes the film stock 62 of FIG. 3 from current standard film stock ST (with a perforation spacing of 0.187"). Also, the dimensions of each perforation 66 (or 46 in FIG. 3) can be varied. The perforations 66 in FIG. 4 are shown as being slightly smaller in width and height than the current perforations 18.

FIG. 4A shows the general case where the frame spacing is shown as P and the perforation spacing is shown as Q. The frame spacing P is measured between the leading edges, the centers, or the trailing edges, of adjacent frames. The perforation spacing Q is chosen so that two or three times Q equals P.

Thus, the invention provides a readily acceptable motion picture system, by providing a new film format which greatly minimizes film wastage. The film frames are spaced apart by more than two current perforation spacings (i.e. by more than 0.38 inch) and by less than 3 current perforation spacings (i.e. less than 0.56 inch). The frame spacing is preferably at least current projection aperture height (i.e. at least 0.446 inch which equals 2.38 times current perforation spacing) and no more than 2.75 times current perforation spacing (i.e. no more than 0.514 inch), or in other words about 0.47 inch. In one embodiment of the invention, current film stock is used (perforation spacing of 0.187") with the film frames spaced by a noninteger number of perforations of between 2 and 3, and preferably 2.5. In a second embodiment of the invention, a modified 35 mm film stock is used, where the perforation spacing is chosen so there is an integer number (e.g. 2 or 3) of perforations per film frame, with the film frame spacing still being about 0.47 inch. Such new film formats result in very little "wastage" of film.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A new commercial theater motion picture distribution film for projecting onto a theater screen, comprising a length of film stock that has two rows of new perforations wherein the new perforation spacing distance is uniform along each row, and which has new film frames spaced along the length of the film, wherein:

said new distribution film has about the same width as standard 35 mm film stock, which has a width of about 35 mm;

said new film frames have centers that are spaced by a distance which is two plus a fraction of a standard 35 mm perforation spacing distance, with said film frames being spaced by more than 0.38 inch but no more than 0.55 inch;

said new perforation spacing distance is chosen so the number of new perforation spacings that equals the spacing of a pair of new film frames, is an integer.

2. The film described in claim 1 wherein: said perforations are spaced by a large new perforation spacing distance which is more than 0.2 inch, with the centers of said film frames spaced by exactly two of said large new perforation spacing distances.

3. The film described in claim 1 wherein:

said perforations are spaced by a small new perforation spacing distance which is less than 0.180 inch, with the centers of said film frames spaced by exactly three of said small new perforation spacing distances.

4. A new motion picture theater distribution film strip comprising:

a continuous length of 35 mm film having a multiplicity of new edge perforations, with a plurality of said new edge perforations having a predetermined center-to-center new perforation spacing and having a plurality of new film frames spaced along the length of the film, wherein said new film frames have centers that are spaced by a plurality of said new perforation spacings;

said new film frames are spaced by a distance of between 0.446 inch and 0.55 inch;

said new perforation spacing distance is chosen so the member of new perforation spacings that equal the spacing of a pair of adjacent new film frames, is an integer.

5. The film strip described in claim 4 wherein:

said edge perforations are spaced by exactly one-half the distance between said film frames, with said perforation spacing distance being between 0.223 inch and 0.27 inch.

6. The film strip described in claim 4 wherein:

said edge perforations are spaced by exactly one-third the distance between said film frames, with said perforation spacing distance being between 0.149 inch and 0.180 inch.

7. A method for producing and projecting a commercial motion picture image, by creating a new motion picture distribution print on new film stock that has new perforations spaced apart along the length of the film stock, and by projecting new film frames of said new distribution print on a screen using a projector of common construction that has film-engaging sprocket wheels that are mounted on shafts and that has at least one motor that turns each of said sprocket wheels in steps by a predetermined fraction of a turn, comprising:

creating said new motion picture film with new film frames, but with the leading edges of said new film frames spaced by about 2.5 times said standard perforation spacing distance, or about 0.47 inch;

said step of creating including creating said new perforations so they are spaced a distance wherein the spacing of adjacent film frames equals an integral number of perforation spacings;

establishing new sprocket wheels on said shafts which are chosen to advance said film in steps that are each about 0.47 inch long.

8. The method described in claim 7 wherein:

said step of creating said new motion picture distribution print includes creating a new film stock with perforations spaced by a new distance which is chosen from the following group: about 0.16 inch so there are three perforations per frame spacing and about 0.23 inch so there are two perforations per frame spacing;

said step of establishing new sprocket wheels includes establishing a new sprocket wheel on each of said shafts, where the circumferential distance between sprocket teeth of each of said new sprocket wheels equals said new distance.

9. A method for producing a commercial theater motion picture distribution print, comprising:

creating an original motion picture film, including using a camera to record images on standard 35 mm film stock with a standard perforation spacing distance of substantially 0.187 inch, with the images thereon spaced by a whole number, or integer number of perforations which is chosen from the group which consists of 3 and 4;

transferring at least portions of each of the images on said original film to a plurality of release prints that each comprises a new film stock with new perforations, including establishing said images on each of said release prints so said images are spaced thereon by a distance which is greater than two times but less than three times said standard perforation spacing distance, and establishing said new perforations of said new film stock so the spacing of the new film frames equals an integral number of spacings of said new perforations.

10. The method described in claim 9 wherein:

said step of transferring includes transferring said images onto film stock which has perforations spaced so said new film frames are spaced by one of the following number of perforations: 2 and 3.

11. The method described in claim 10 wherein;

said perforation spacing distance is chosen from the following set of distances: about 0.16 inch and about 0.23 inch.

* * * * *